United States Patent [19]
Coffman

[11] 3,712,523
[45] Jan. 23, 1973

[54] LUGGAGE CARRIER AND CAMPER SLEEPER

[76] Inventor: Clifford Clyde Coffman, 6923 Overlook Drive, Dallas, Tex. 75227

[22] Filed: June 8, 1970

[21] Appl. No.: 44,240

[52] U.S. Cl. ............... 224/42.1 E, 5/119, 74/89.16
[51] Int. Cl. ............................................... B60r 9/04
[58] Field of Search .......... 224/42.1 E, 42.01, 42.1 R; 5/119; 135/1 A, 3 A, 4 A, 5 A; 74/89.16

[56] References Cited

UNITED STATES PATENTS

| | | | |
|---|---|---|---|
| 3,145,046 | 8/1964 | Orn | 296/26 |
| 3,341,096 | 9/1927 | Stanley | 224/42.1 X |
| 3,160,435 | 12/1964 | Smith | 296/23 |
| 2,076,986 | 4/1937 | Floraday | 74/89.16 |
| 3,311,404 | 3/1967 | Thomas | 224/42.1 E X |
| 3,575,460 | 4/1971 | Kennedy | 135/1 A |

Primary Examiner—Drayton E. Hoffman
Assistant Examiner—George F. Abraham
Attorney—Wofford, Felsman & Fails

[57] ABSTRACT

A vertically expansible luggage carrier and camper sleeper for mounting on the top of a motor vehicle and having means for conveniently suspending the assembly from overhead supports in a garage or carport. The invention is further characterized by electrically operated pivot arms for vertically expanding and contracting the carrier-sleeper.

4 Claims, 8 Drawing Figures

PATENTED JAN 23 1973
3,712,523
SHEET 1 OF 3
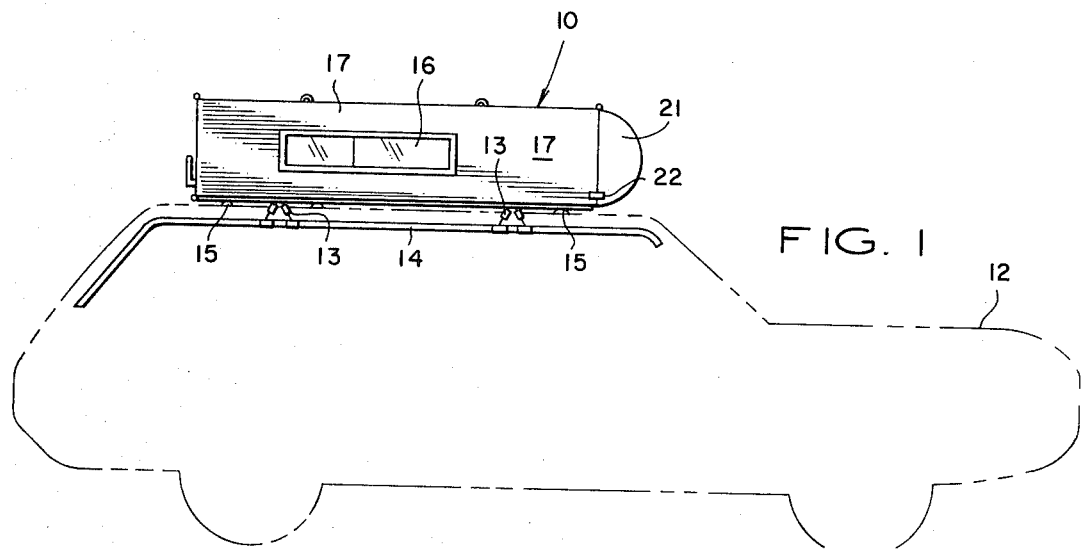
FIG. 1
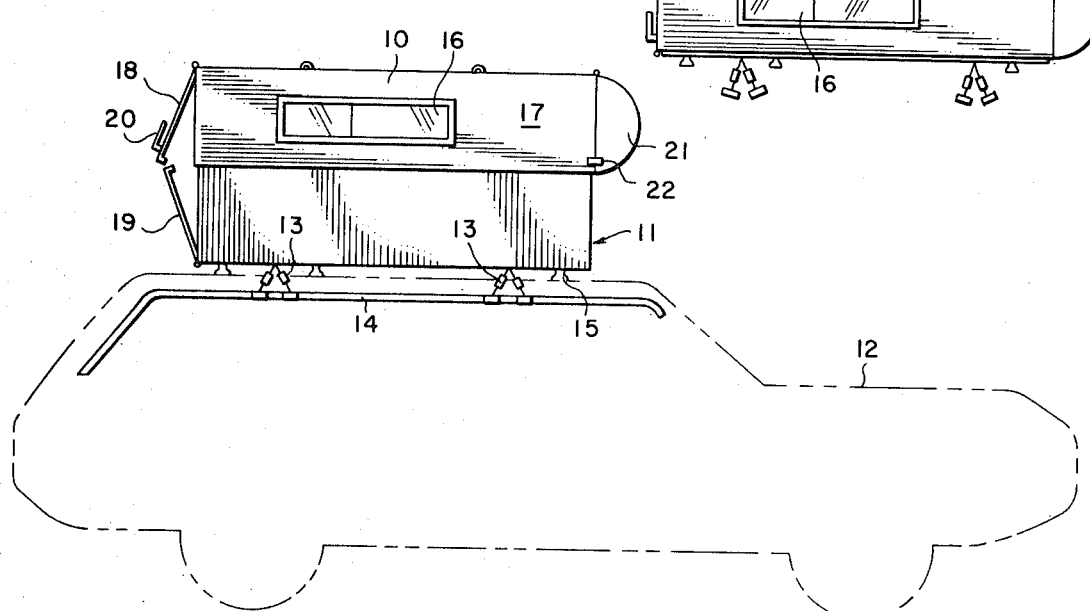
FIG. 3
FIG. 2
INVENTOR
C. CLYDE COFFMAN
Herbert J. Brown
ATTORNEY

INVENTOR
C. CLYDE COFFMAN

Herbert J. Brown
ATTORNEY

INVENTOR
C. CLYDE COFFMAN

Herbert J. Brown

ATTORNEY

LUGGAGE CARRIER AND CAMPER SLEEPER

This invention relates to carriers for mounting on the tops of motor vehicles and has reference to a combined luggage carrier and sleeping compartment. Generally, the invention is directed to upper and lower telescoping units which are vertically expanded and contracted by electric power. The units are expanded when the assembly is used as a sleeper and are contracted when the assembly is used as a carrier. As will become apparent, the contracting operation is utilized when storing the assembly overhead.

An object of the invention is to provide an improved vertically expansible carrier-sleeper for mounting on the top of a vehicle such as an automobile.

Another object is to provide a carrier-sleeper assembly for mounting on the top of a vehicle and including power operated pivoted arms for telescopically operating upper and lower housing units.

Another object is to provide powered telescopic means for assistance when attaching the carrier-sleeper to a ceiling, rafters or the like for storage.

A further object is to provide a lightweight carrier-sleeper having reinforcing means which do not materially add to the weight of the assembly.

Another object is to provide means for automatically sealing the upper and lower units when the latter are in their fully extended positions.

These and other objects of the invention will become apparent from the following description and the accompanying drawings, in which:

FIG. 1 is a side elevational view of a carrier-sleeper according to the invention and showing the same mounted on top of an automobile, the latter being shown by means of phantom lines.

FIG. 2 is a view similar to FIG. 1 but showing the carrier-sleeper in its vertically extended position.

FIG. 3 is a side elevational view of the carrier-sleeper suspended from a rafter.

Figure 4:
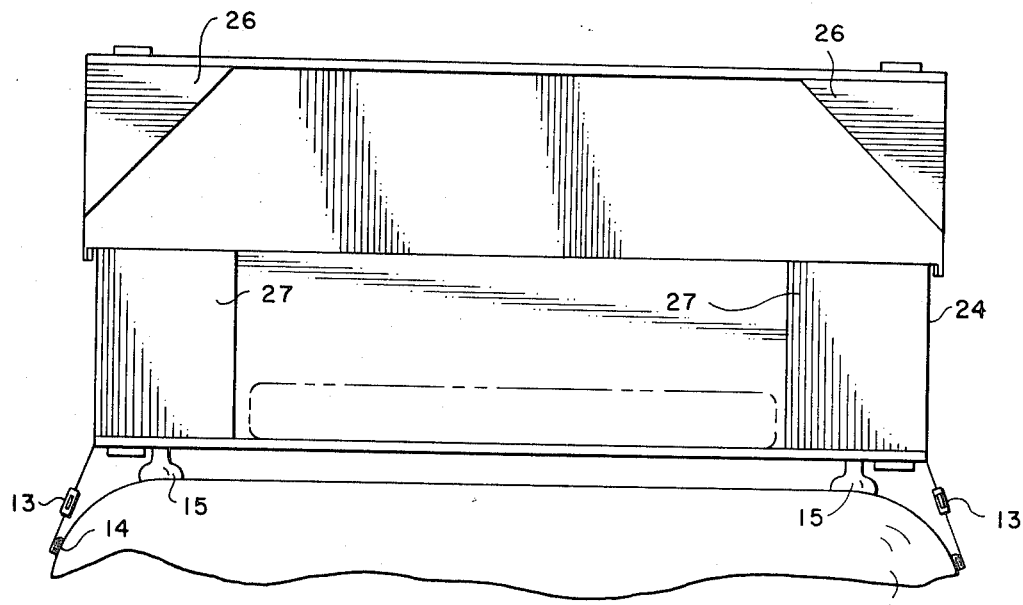
FIG. 4 is an enlarged rear view of the carrier-sleeper in its extended position.

The carrier-sleeper shown includes upper and lower rectangular telescoping units 10 and 11 for mounting on the top of an automobile 12 by means of turnbuckles 13 attached to the vehicle's rain gutter 14. Preferably, there are resilient suction cups 15 on the bottom of the lower unit 11 for contacting the roof of the automobile 12. Other details shown in FIGS. 1—3 include windows 16 in the side walls 17 of the upper unit 10, horizontal elongate doors 18 and 19 hinged to the upper and lower transverse rear edges of the two units, a latch 20 for securing the two doors in closed position, an arcuate closure 21 on the front of the upper unit and hinged to the top edge of the latter, and fasteners 22 for securing the hinged closure to the upper unit. Since the details last referred to are not specifically a part of the invention, and since they are well known to the art, they are not herein described in detail.

Figure 6:
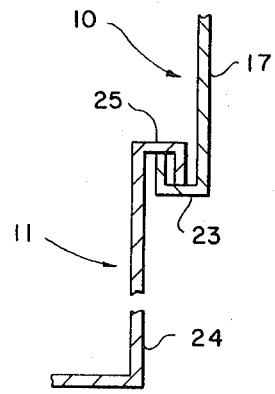
FIG. 6 is a fragmentary sectional view of lips on the upper and lower units for sealing adjoining edges when the assembly is extended.

Referring now to FIG. 6, the lower edges of sides of the side walls 17 of the upper unit 10 are inwardly and upwardly formed to provide reverse bend lips 23 whereas the upper edges of the side walls 24 of the lower unit 11 are oppositely formed to provide interfitting lips 25. As will become apparent, the interfitting lips 23 and 25 not only provide seals along the sides of the units 10 and 11 but also limit vertical expansion.

Figure 5:
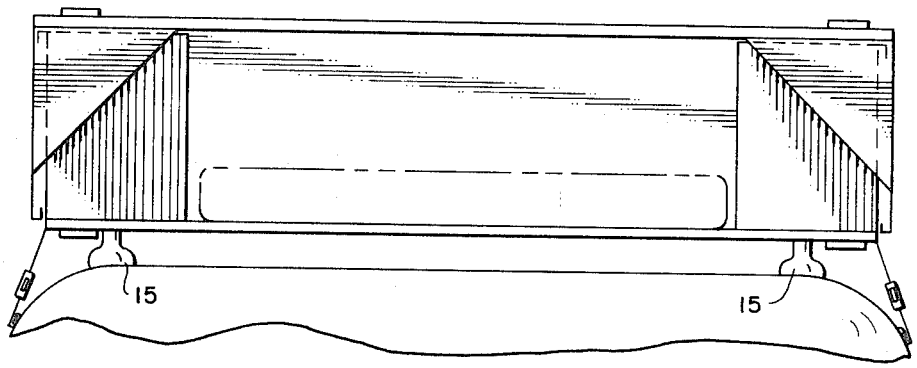
FIG. 5 is a view similar to FIG. 4 but showing the carrier-sleeper in its retracted or travel position.

Although the rear ends of the upper and lower units 10 and 11 are substantially open, except when closed by the doors 18 and 19, the corners of the units are reinforced as shown in FIGS. 4 and 5 by rectangular and triangular gussets 26 and 27. The triangular gussets 26 are outside of the rectangular gussets when the assembly is in its closed position.

Figure 7:
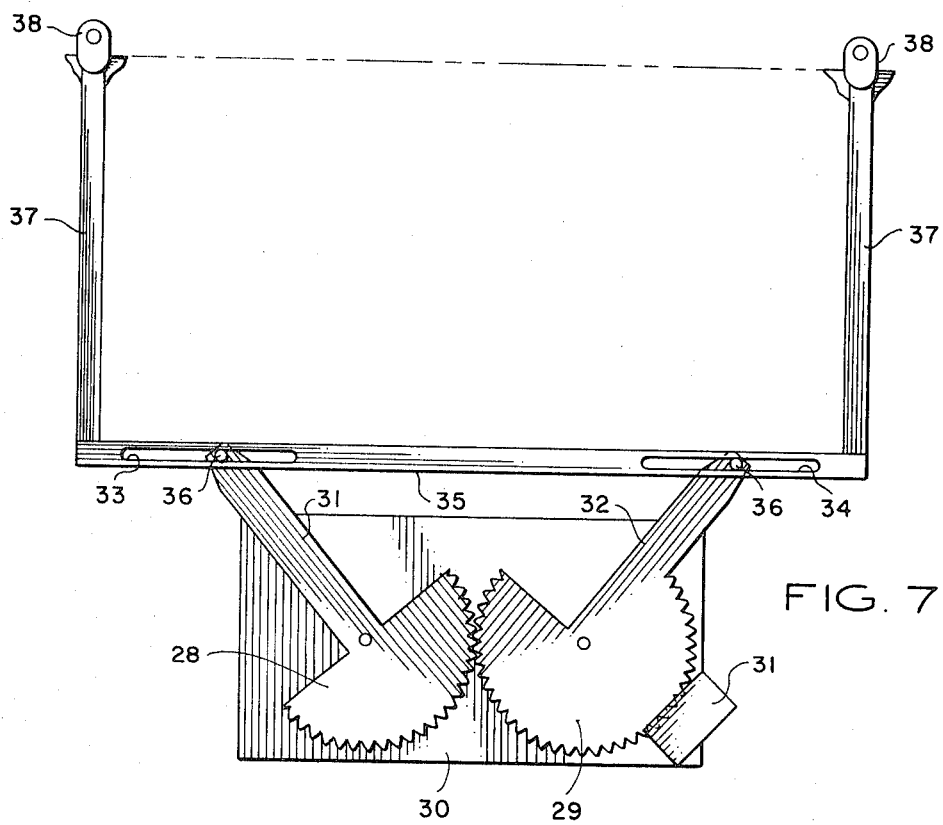
FIGS. 7 and 8 are inside elevational views of the lifting and contracting mechanism located inside of the assembly.
Figure 8:
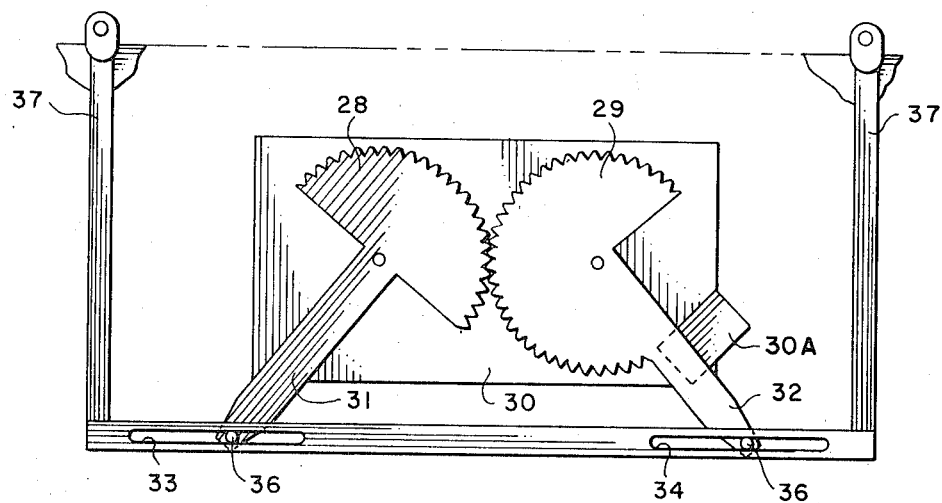

Referring now to FIGS. 7 and 8, the means for expanding and contracting the upper and lower units 10 and 11 is primarily directed to pairs of segment gears 28 and 29 mounted on plates 30 on the inner surfaces of the side walls 24 of the lower carrier-sleeper unit 11. The gears 28 and 29 may be covered with sheet material, not shown. The pairs of gears 28 and 29 mesh with each other and one of the gears 29 is driven by a reversible electric motor 30A. Each gear 28, 29, has a laterally extending lift arm 31, 32, the extending ends of which engage longitudinal cam slots 33, 34, in a horizontal lift bar 35 by means of rollers 36 on the extending ends of the arms. The lift bars 35 are mounted on the lower inner surfaces of the side walls of the upper unit 10 and have upwardly projecting support arms 37 extending from the ends thereof. Eyes 38 on the upper ends of the support arms 37 provide means for attachment to rafters 39 or other overhead support means by chains 40. See FIG. 3.

The motors 31 on each side of the lower unit 11 are of the same size and operate their respective pairs of gears 28, 29 at the same speed. All lifting arms 31, 32 are of the same length and, thus, the upper unit 10 may be raised and lowered without canting. Since power is applied for contracting the assembly, the vehicle 12 may be driven under the chains 40 depending from the rafters 39 while the assembly is in its extended position. The chains 40 are then connected to the eyes 38 on the support arms 37 and the toggles 13 holding the assembly on the vehicle 12 are disconnected. The lower unit 11 is then raised by the motors 31, after which the vehicle 12 is free to move without the carrier-sleeper assembly.

The invention is not limited to the exemplary construction herein shown and described, but may be made in various ways within the scope of the appended claims.

What is claimed is:

1. A carrier-sleeper assembly for mounting on the roof of a vehicle, said assembly comprising:

upper and lower telescopic units adapted to expand and contract, said lower unit adapted to be releasably coupled to the roof of a vehicle and having bottom structure and side walls extending upwardly therefrom when said lower unit is coupled to the roof of a vehicle, said upper unit having a top and side walls extending downwardly therefrom when said assembly is mounted on the roof of a vehicle, reversible electric power means located in the interior of said upper and lower units, and reversible drive means located in the interior of said upper and lower units and mounted to said lower unit, said reversible drive means being coupled to said power means and to said upper unit for expanding and contracting said units when driven by said electric power means, said upper unit has means for coupling said upper unit to an overhead support for supporting said carrier-sleeper assembly when uncoupled from the roof of a vehicle, said reversible electric power means and said reversible drive means being adapted to raise and lower said upper unit when said lower unit is coupled to the roof of a vehicle and adapted to raise and lower said lower unit when said lower unit is uncoupled from the roof of a vehicle and when said upper unit is coupled to and supported by an overhead support.

2. The assembly of claim 1 wherein:

the side walls of said upper unit are adapted to fit around the side walls of said lower unit when said units are contracted.

3. The assembly of claim 2 wherein:

the lower edges of the side walls of said upper unit have lips which are inwardly and upwardly formed, the upper edges of the side walls of said lower unit have lips which are outwardly and downwardly formed for engaging the lips of the lower edges of the side walls of the said upper unit when said assembly is expanded to limit vertical expansion.

4. The assembly of claim 3 wherein said reversible drive means comprises:

horizontal means mounted on opposite sides of said upper unit, said horizontal means each having horizontal cam slots formed therein, said drive means including a pair of meshing gear means located on opposite sides of said lower unit, each pair of meshing gear means having arms extending therefrom and movably engaging said slots of said horizontal means respectively for expanding and contracting said units when said gear means are driven by said reversible electric power means.

* * * * *